J. A. Merriman,
Corn-Sheller.

No. 74,569. Patented Feb. 18. 1868

Attest: M. A. Merriman, J. E. Miller.

John A. Merriman

United States Patent Office.

JOHN A. MERRIMAN, OF CHICAGO, ILLINOIS.

Letters Patent No. 74,569, dated February 18, 1868.

IMPROVEMENT IN CORN-SHELLERS.

*The Schedule referred to in these Letters Patent and making part of the same.*

TO ALL WHOM IT MAY CONCERN:

Be it known that I, JOHN A. MERRIMAN, of Chicago, in the county of Cook, and State of Illinois, have invented a new and improved Corn-Sheller; and I do hereby declare that the following is a full, clear, and exact description of the construction and operation of the same, reference being had to the accompanying drawings, making a part of this specification, in which—

Similar letters of reference indicate like parts.

This invention consists in an irregular conical-shaped shelling-wheel, provided with channels for the ears of corn, running in the inside of the frustum of a cone, the inner surface of which is armed with teeth and ribs, either or both; a perforated annular cob-receiver, underneath and extending beyond the periphery of the wheel, having a discharge at one side; an annular corn-receiver, under the cob-receiver, having one or more discharges at the bottom; a series of fan-wings attached to the shelling-wheel, and revolving with it, which blow the chaff from the corn as it drops through the holes in the cob-receiver; a cob-conveyer, attached to the shelling-wheel, and running around in the cob-receiver, carrying the cobs before it, and throwing them out at the discharge; a corn-conveyer, attached to the shelling-wheel, carrying the corn around to the discharge, arranged and combined in such a manner that the ears of corn, being thrown promiscuously into the hopper above the shelling-wheel, are, by centrifugal force and their own gravity, made to slide into the channels, when the corn, coming in contact with the teeth upon the shelling-cone, is shelled from the cobs, which, having passed through the channels, drop into the cob-receiver, and are carried by the conveyer and thrown out at the discharge. The corn and chaff drop through the holes in the cob-receiver, the chaff is blown out by the fan-wings, and the corn falling into the corn-receiver is carried by the conveyer to the discharge.

Figure 1:
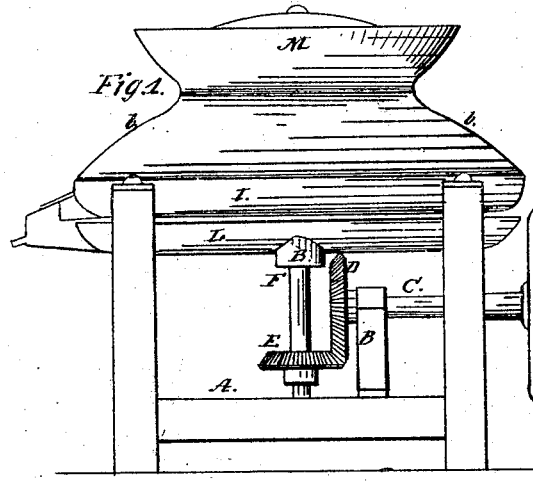
Figure 1 represents a side elevation.
Figure 2:
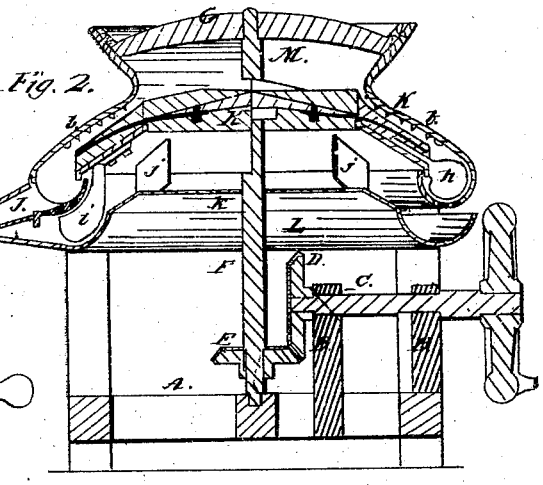
Figure 2 is a transverse vertical section, the plane of section through the shelling-wheel (between the points marked $x$ $x$) being indicated by the line $y$ $y$, fig. 4, and through the other parts by the line $z$ $z$, figs. 3 and 5.
Figure 3:
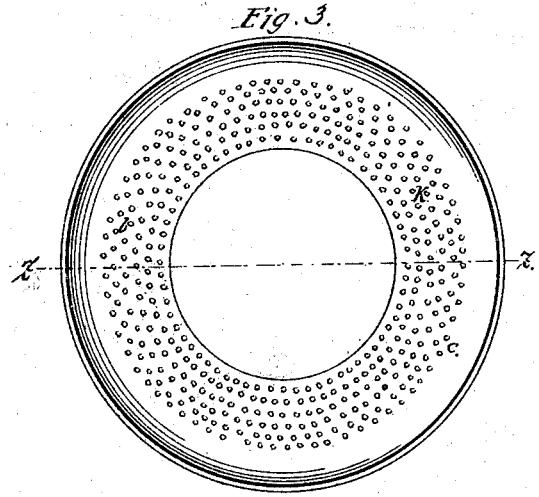
Figure 3 is a view of the shelling-cone inverted.
Figure 4:
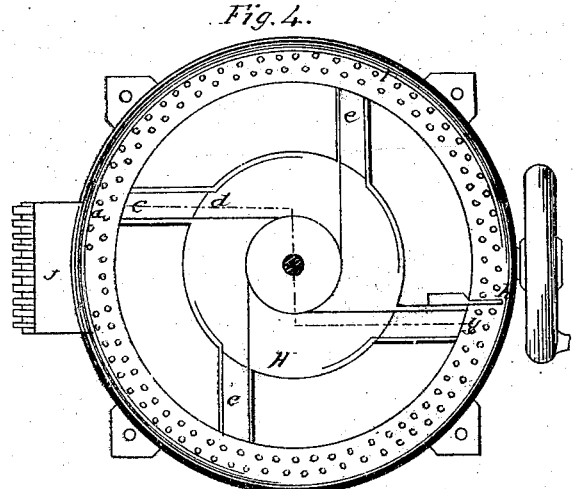
Figure 4 is a top view, showing the shelling-wheel and cob-receiver, the shelling-cone being removed.
Figure 5:
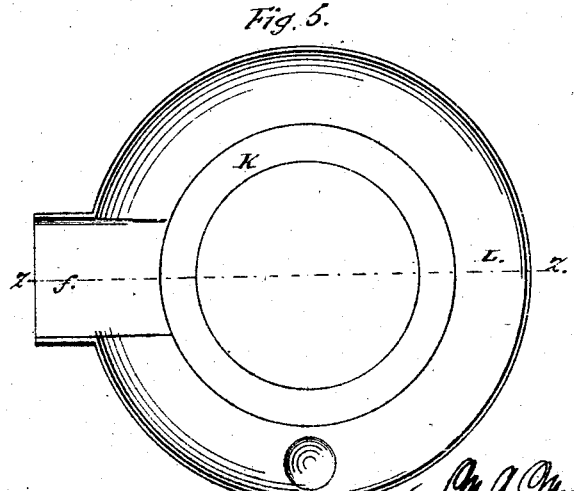
Figure 5 is a top view of the corn-receiver.
Figure 6:
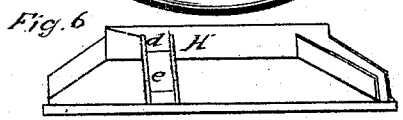
Figure 6 is a side elevation of the shelling-wheel.
Figure 7:
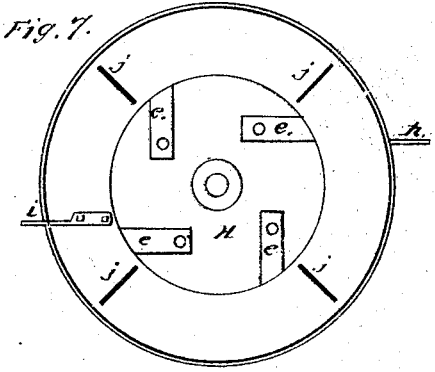
Figure 7 is a view of the same inverted.

A represents a frame, made of wood or iron, from which rise two standards, B B, which form the bearings for the shaft C, to which the power is applied. Upon this shaft, C, is the bevel-gear, D, which meshes into the wheel E, upon the upright shaft F. This upright shaft has its bearings on the frame A and the cross-bar G. Near the upper end of the shaft F is firmly fastened the shelling-wheel H, which is made to revolve by means of the shafts C and F, and the gears D and E, as will be readily understood. Upon the top of the frame A is firmly fastened the annular cob-receiver I. This receiver is made dishing, and extends around the shelling-wheel in such a manner that the cobs, after being discharged from the wheel, will fall into it. A portion of it is made gradually deeper, which terminates in an incline downward and outward, forming the discharge J. The bottom of this discharge may be composed of wire, that the corn may the more readily pass through and be separated from the cobs. The bottom of the receiver, around its entire circumference, is perforated for the same purpose. At the point marked $a$, the bottom of the receiver rises abruptly to its regular height, forming a switch, so that the cobs may not pass around the second time, but be driven directly out at the discharge. Securely fastened to the top of the cob-receiver I, and thereby to the frame, is the frustum of a cone, K. This cone is somewhat irregular in shape, being slightly belled outward at the top, where it joins the hopper, and slightly swelled outward along its centre, and curved inward at its base, where it joins the cob-receiver. The bell-shape at the top facilitates the entrance of the ears of corn; the swell along the centre (marked $b$) conforms to the shape of the ears of corn, and thereby insures the shelling of the ends and tips of the ears. The exact shape of this cone may, however, be varied, if found necessary. The inner surface of this cone is armed with teeth and ribs, either or both, extending as far as the diameter of the shelling-wheel, at which point there is a series of ribs $c$, (see fig. 3,) which are set a trifle spiralling. The object of these ribs is to keep the tip of the cob off the teeth, so that it will not be torn and broken after having been shelled, and also by their spiral position to draw the cob out more rapidly. In the inside of this frustum of a cone above described the shelling-wheel H is made to revolve by means already described. This shelling-wheel is conical-shaped in its general form, though irregular, and is provided with channels d, of which there may be any number, according to the capacity of the machine. These channels begin near the apex of the cone and gradually deepen, or incline downward, as they approach the base or periphery of the shelling-wheel. This inclined shape facilitates the entrance and passage outward of the ears of corn. In the bottom of these channels, or that portion of them which comes under the shelling-cone, are spring-pressure plates e, which press the ears of corn upward against the teeth in the shelling-cone, and also are capable of yielding, so as to conform to the size of the ears. The direction of the channels before described is parallel with a tangent to the circumference of the shelling-wheel. This direction may, however, be radial with respect to the shelling-wheel, but I prefer the tangential direction, as it causes the ears to be drawn outward as they come in contact with the teeth and are being shelled. Underneath the cob-receiver I, and fastened firmly to the frame of the machine, is the corn-receiver L, which catches the corn as it drops through the holes in the cob-receiver. This corn-receiver is provided with an apron, f, at one side, corresponding with the cob-discharge J, and immediately under it, for the purpose of catching the corn at that point. It is also provided with a discharge, g, where the bag or other receptacle may be placed. There may be one or more of these discharges, as is convenient. Attached to the shelling-wheel H, and revolving with it, is the cob-conveyer h, which runs around in the cob-receiver, and carries the cobs around and throws them out at the discharge. The corn-conveyer i is also attached to the shelling-wheel, and revolves with it, running around in the corn-receiver, and carrying the corn around to the discharge. Attached to the under side of the shelling-wheel is a series of fan-wings, j. The corn-receiver L has a flange, k, extending around its inner periphery and under the fan-wings, which guides the blast produced by the fan-wings in such a manner as to throw it through under the cob-receiver, striking the chaff as it falls through the holes, and carrying it outside of the machine on all sides. The whole arrangement of the cob-receiver, corn-receiver, conveyers, and fan-wings may be dispensed with, in case the machine is used only for shelling. The shelling-cone K is surmounted with a hopper, M, into which the corn is thrown promiscuously.

The operation of this machine is as follows: The ears of corn are thrown into the hopper, and by the centrifugal force of the revolving shelling-wheel and their own gravity, slide directly into the channels, and are carried under the shelling-cone, when, coming in contact with the teeth, the corn is shelled from the cobs, which, having passed through the channels, drop into the cob-receiver, and are carried by the conveyer, and thrown out at the discharge. The corn and chaff dropping through the holes in the cob-receiver, the chaff is blown out by the blast produced by the fan-wings, and the corn, being caught by the corn-receiver, is carried by the conveyer to the discharge.

Having thus minutely described the construction and operation of my invention, I do not wish to be understood as confining myself to this particular construction of all the parts, but claim as follows:

1. I claim the shelling-wheel H, provided with one or more channels, d, having elastic or yielding bottoms, in combination with a shelling-cone, K, arranged and operating substantially in the manner and for the purposes set forth.

2. I claim, in combination with a corn-shelling wheel and cone, an annular cob-receiver, I, and cob-conveyer h, arranged and operating substantially in the manner and for the purposes described.

3. I claim, in combination with the shelling-devices and cob-receiver, as above described, an annular corn-receiver, L, and corn-conveyer, i, arranged so as to operate substantially as specified.

4. I claim, in combination with a shelling-wheel, H, cob-receiver, I, and corn-receiver, L, the arrangement of fan-wings j, operating as and for the purposes shown and set forth.

JOHN A. MERRIMAN.

Witnesses:
M. A. MERRIMAN,
J. E. MILLER.